April 12, 1960 SHIGEKI YAMATO ET AL 2,932,729
COMMUNICATION SYSTEM WITH INTERLOCKING CALLING SYSTEM
Filed Jan. 28, 1954
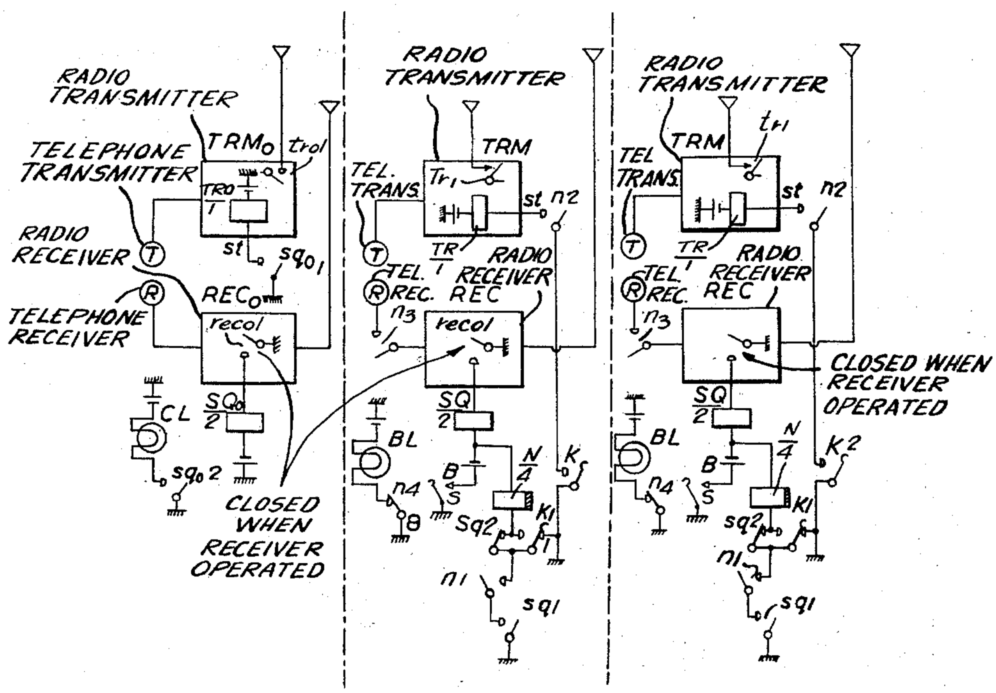
Master Station Set. Subscriber's Station Set No.1. Subscriber's Station Set No2.
Inventors
S. YAMATO - T. SUDO
By [signature]
Attorney 2,932,729

COMMUNICATION SYSTEM WITH INTERLOCKING CALLING SYSTEM

Shigeki Yamato and Taro Sudo, Minato-ku, Japan, assignors to International Standard Electric Corporation, New York, N.Y., a corporation of Delaware Application January 28, 1954, Serial No. 406,763

Claims priority, application Japan February 12, 1953

5 Claims. (Cl. 250—6)

This invention relates to communication systems and particularly to systems in which a plurality of sub-stations have access to a master station over a single communication channel.

One of the objects of the invention is to provide a communication system having a master station and a plurality of sub-stations in which when one sub-station is connected to the master station no other sub-station can interfere.

Another object of the invention is to provide a communication system, as in the paragraph above, in which both the transmitter and the receiver of all the sub-stations except the one in communication with the master station are blocked until the communication between the connected sub-station and master station has terminated.

Another object of the invention is to provide a communication system, as defined in the above paragraphs, in which signalling means is provided at each sub-station to indicate whether or not the communication channel is in use.

Another object of the invention is to provide a communicating system having a master station, and a plurality of sub-stations in which means is provided for blocking the transmission from a sub-station which attempts to establish or has established a communication connection with the master station if the communication channel is disrupted for a predetermined period of time for any reason whatsoever.

The above mentioned and other features and objects of this invention and the manner of attaining them will become more apparent and the invention itself will be best understood by reference to the following description of an embodiment of the invention taken in conjunction with the accompanying drawing, in which the single figure is a circuit diagram of a master station and two sub-stations adapted to have communication therewith.

Broadly the invention comprises a communication system having a master station and a plurality of sub-stations connected to the master station over a single communication channel with means in each sub-station to respond to a signal transmitted from the master station and means in each sub-station controlled by said responsive means and adapted to operate a predetermined time after receipt of a signal from the master station to disconnect the sub-station transmitting and receiving means if said sub-station has not originated the call, but to maintain the transmitting means and the receiving means in operation if said sub-station has originated the call, there being means at said master station for receiving a signal from a sub-station and means at said master station for transmitting a signal under control of said receiving means.

The invention may be used with any type of communication system where a master station is adapted to be connected to any one of a plurality of sub-stations over a single communication channel, but for purposes of explanation we have chosen to illustrate a carrier system in which the communication channel is a radio carrier wave and the master station and sub-stations each have radio transmitters and receivers tuned to the frequency of the particular carrier wave.

The system of the invention will now be described in connection with the figure. The switches S in the subscribers' stations are first closed to connect the batteries B. Assume the system is not in use, so that none of the radio transmitters TRM at the sub-stations or $TRM_0$ at the master station is in use, and the operator at sub-station No. 1 desires to communicate with the master station. At this time, the relay N at each substation is operated over a circuit which may be traced from negative battery, indicated at B, winding of N, break contact 2 of the relay SQ, break contact 1 of the switch-hook K of the sub-station in its normal position, to ground. Because of the operation of relay N, the busy light BL is not operated, the circuit being open at *n4*; however, the circuit for the radio transmitter TRM is prepared at contact *n2* and the circuit for the telephone receiver R is prepared at contact *n3*. All sub-stations are in the same condition with the N relays operated.

In calling the master station, the operator at sub-station No. 1 lifts the receiver from the switch-hook K. This closes switch-hook contact *k2* which starts the transmitter TRM over a circuit from battery in the transmitter TRM, through the transmitter control relay TR, start-lead ST, contact *n2*, contact *k2*, to ground. Relay TR, by closing contact *tr1*, starts the transmitter which sends out a carrier wave which is picked up by the receiver $REC_0$ at the master station and a control contact $rec_0 1$ in the receiver is operated which operates the relay $SQ_0$, this circuit being from ground in the receiver $REC_0$, through the operated control contact $rec_0 2$, through the winding of relay $SQ_0$ to negative battery. The operation of $SQ_0$ closes contact $sq_0$–2 to operate the calling light CL in an obvious circuit which notifies the operator at the master station that a sub-station is calling. At the same time relay $SQ_0$ closes contact $sq_0$–1 which start the radio transmitter $TRM_0$ operating. This circuit may be traced from negative battery in the transmitter through the winding of the transmitter control relay $TR_0$, the start-lead ST, switch contact $sq_0$–1 to ground. Relay $TR_0$ starts the transmitter over contact $tr_0 1$.

At the same time that transmitter TRM of sub-station 1 starts to transmit, the circuit for relay N of that sub-station is broken at the switch-hook contact *k*–1. However, the relay N is a slow-release relay and therefore does not immediately release, and if the signal from the master station is properly received it does not release at all. The signal from the master station is received by the receiver REC at each sub-station and closes a contact *rec1* in the receiver to operate relay SQ over a circuit from ground in the receiver, the control contact *rec1*, which is now closed, winding of relay SQ to negative battery at B. The operation of relay SQ opens the contact *sq*–2, and closes contact *sq*–1.

A holding circuit for relay N of the calling substation No. 1 is now provided from negative battery at B, winding of N, make contact *k1*, make contact *n1* make contact *sq1*, to ground. With the relay N held operated in this manner, station No. 1 is connected to the master station and two-way communication may be had between these two stations using the transmitters and receivers of both.

If for any reason whatever, sub-station No. 1 does not receive the signal from the master station, the SQ relay at that sub-station will not operate. Then, after a short interval of time, relay N will release, since its operating circuit is opened at *k1*, and its holding circuit is opened at $sq1$. The release of relay N does four things: at contact $n1$, it opens the holding circuit for relay N at another point; at contact $n2$, it opens the start circuit for the radio transmitter TRM, thus shutting off the transmission from sub-station No. 1; at contact $n3$, disconnects the receiver unit R from the receiver circuit REC; and at contact $n4$ it closes the circuit through the busy lamp BL to indicate to the operator of sub-station No. 1 that he cannot communicate with the master-station at this time. The operator will then hang up his receiver.

Assume now that communication has been established between sub-station No. 1 and the master station. Since the master station is transmitting a carrier over radio transmitter $TRM_0$, this signal will be picked up by the receiver circuit REC of sub-station No. 2. Relay SQ of sub-station No. 2 will be operated, similarly to relay SQ of sub-station No. 1. The operation of relay SQ will open the normal operating circuit for relay N at $sq2$ and relay N will be released. As has already been stated in connection with sub-station No. 1, the unoperated condition of relay N in sub-station No. 2 will operate the indicating lamp BL to advise the operator of sub-station No. 2 that the channel is busy.

If, in spite of the busy indication, the operator of sub-station No. 2 removes his receiver in an attempt to reach the master station, his transmitter will not operate because the operating circuit connected to the start lead ST is opened at contact $n2$. He is also prevented from hearing what is happening over the communication channel because the receiver unit R is disconnected from his receiver circuit REC at contact $n3$.

All other sub-stations will, of course, function in the same manner, so that the operators of each are advised that a busy condition exists and are prevented from interfering with the communication between the master station and the sub-station connected thereto.

As soon as the communication between the master station and the particular sub-station connected thereto has terminated, the signal from the master station radio transmitter $TRM_0$ will be shut off and the relays SQ in the other sub-stations will release, thus permitting the N relays to operate over break contacts $sq2$ and $k1$, to turn off the busy lamp BL by opening contact $n4$ and prepare the radio transmitter at make contact $n2$ and the receiver unit at make contact $n3$ for operation when the receiver is removed from the switch hook K.

From the above it will be seen that we have provided a communication system for a master station and a plurality of sub-stations in which as long as the system is not in use any sub-station may be connected to the master station, and when it is so connected and communication is established, then no other sub-station may interfere with that communication or transmit or receive over the channel. The system functions equally as well when a sub-station fails to act properly because of some fault in the transmitter or receiver, or because the signal produced either by the master station or by the sub-station is not of sufficient strength to operate the receiver of the other.

While we have described above the principles of our invention in connection with specific apparatus, it is to be clearly understood that this description is made only by way of example and not as a limitation to the scope of our invention as set forth in the objects thereof and in the accompanying claims.

What we desire to secure and claim by Letters Patent is:

1. A communication system comprising a master station having a transmitter and a receiver, a plurality of sub-stations each having a transmitter and a receiver, a slow release relay at each sub-station, a receiver relay at each sub-station adapted to operate in response to a signal received by the receiver of said sub-station, means for normally operating said slow release relay including a make contact of said receiver relay, call initiating means at each sub-station, the operating circuit for said slow release relay including a break contact of said call initiating means, a hold circuit for said slow release relay at each sub-station comprising a make contact of said slow release relay, a make contact of said receiver relay, and a make contact of said call initiating means, and means controlled by a make contact of said slow release relay for operating the transmitter at said sub-station.

2. A communication system, as defined in claim 1, further comprising indicating means, and means for operating said indicating means only when said slow release relay has released.

3. A communication system comprising a master station and a plurality of sub-stations, each station including a transmitter and a receiver, each sub-station including a slow-restoring first control relay and circuit means for maintaining it normally energized and operated, each sub-station including an actuatable and restorable call-initiating device, means responsive to actuation of the call-initiating device at any sub-station for de-energizing the first control relay thereat and for operating the associated transmitter to transmit a sub-station signal continuously dependent upon the continued operated condition of the call-initiating device and of the first control relay, the receivers at the other control stations being non-responsive to the transmitted sub-station signal, the receiver at the master station being responsive to the transmitted sub-station signal, means at the master station for operating the transmitter thereat to transmit a continuous master-station signal responsive to the sub-station signal being continuously received at the master station, the receiver at each sub-station being responsive to the master-station signal, each sub-station including a second control relay and means for operating it from the local sub-station receiver responsive to receipt thereby of the master-station signal, and means responsive to the operation of the second control relay for either energizing or de-energizing the first control relay thereat, depending upon whether the call-initiating device at said sub-station is in operated condition or is in restored condition, the first control relay being sufficiently slow-restoring that it remains operated for the interval required for the said transmission of a sub-station signal to cause the said transmission of the mater-station signal to result in the said operation of the associated second control relay, whereby the first control relay is again energized and held operated at the call-initiating sub-station and is restored at all other sub-stations if the said sub-station signal causes the said master-station signal to be transmitted, thereby insuring that no other sub-station can initiate a call so long as the call-initiating means at the initiating station remains effectively operated.

4. A communication system according to claim 3, wherein the said master-station signal is a carrier signal, means at the master station for applying a message signal to the carrier signal, each sub-station including a translating device responsive to the message signal when such device is connected to the associated receiver, and means for connecting the translating device at any sub-station to the associated receiver subject to the said first control relay thereat being in operated condition.

5. A communication system comprising a master station and a plurality of sub-stations, each station including a transmitter and a receiver, each sub-station including a slow-restoring first control relay and circuit means for maintaining it normally energized and operated, each sub-station including an actuatable and restorable call-initiating device, means responsive to actuation of the call-initiating device at any sub-station for de-energizing the first control relay thereat and for operating the associated transmitter to transmit a sub-station signal continuously dependent upon the continued operated condition of the call-initiating device, the receivers at the control stations being non-responsive to the transmitted sub-station signal, the receiver at the master station being responsive to the transmitted sub-station signal, means at the master station for operating the transmitter thereat to transmit a continuous master-station carrier signal responsive to the sub-station signal being received at the master station, the receiver at each sub-station being responsive to the master-station signal, each sub-station including a second control relay and means for operating it from the local sub-station receiver responsive to receipt thereby of the master-station signal, means responsive to the operation of the second control relay for either energizing or de-energizing the first control relay thereat, depending upon whether the call-initiating device at said sub-station is in operated condition or is in restored condition, the first control relay being sufficiently slow-restoring that it remains operated for the interval required for the said transmission of a sub-station signal to cause the said transmission of the master-station signal to result in the said operation of the associated second control relay, whereby the first control relay is again energized and held operated at the call-initiating sub-station and is restored at all other sub-stations if the said sub-station signal causes the said master-station signal to be transmitted, thereby insuring that no other sub-station can initiate a call so long as the call-initiating means at the initiating station remains operated, means at the master station for applying a message signal to the master-station carrier signal, each sub-station including a translating device responsive to the message signal when such device is connected to the associated receiver, and means for connecting the translating device at any sub-station to the associated receiver subject to the said first control relay thereat being in operated condition.

References Cited in the file of this patent

UNITED STATES PATENTS

| | | |
|---|---|---|
| 2,061,699 | Fox | Nov. 24, 1936 |
| 2,623,164 | Herrick | Dec. 23, 1952 |
| 2,662,974 | Dorff | Dec. 15, 1953 |
| 2,684,436 | Dimmer | July 20, 1954 |
| 2,693,526 | Dimmer | Nov. 2, 1954 |